(12) United States Patent
Limastian

(10) Patent No.: US 10,787,717 B2
(45) Date of Patent: Sep. 29, 2020

(54) METHOD OF UTILIZING FURNACE OFF-GAS FOR REDUCTION OF IRON OXIDE PELLETS

(71) Applicant: Narong Limastian, Bangkok (TH)

(72) Inventor: Narong Limastian, Bangkok (TH)

( * ) Notice: Subject to any disclaimer, the term of this patent is extended or adjusted under 35 U.S.C. 154(b) by 279 days.

(21) Appl. No.: 15/746,811

(22) PCT Filed: Jul. 15, 2016

(86) PCT No.: PCT/TH2016/000062
§ 371 (c)(1),
(2) Date: Jan. 23, 2018

(87) PCT Pub. No.: WO2017/014699
PCT Pub. Date: Jan. 26, 2017

(65) Prior Publication Data
US 2020/0080163 A1    Mar. 12, 2020

(30) Foreign Application Priority Data

Jul. 23, 2015 (TH) .............................. 1501004150

(51) Int. Cl.
*C21B 13/00* (2006.01)

(52) U.S. Cl.
CPC ...... *C21B 13/0073* (2013.01); *C21B 13/0093* (2013.01); *C21B 2100/40* (2017.05); *C21B 2100/64* (2017.05)

(58) Field of Classification Search
CPC ............ C21B 13/0073; C21B 13/0093; C21B 2100/64; C21B 2100/40
See application file for complete search history.

(56) References Cited

U.S. PATENT DOCUMENTS

| 1,517,402 | A | * | 12/1924 | Constant | ............. C21B 13/0073 75/505 |
| 2,702,605 | A | * | 2/1955 | Kneass, Jr. | ............. C10B 21/14 96/372 |
| 4,690,387 | A | * | 9/1987 | Rockenschaub | .......... C21C 5/38 266/144 |
| 4,701,214 | A | * | 10/1987 | Kaneko | ................. C21B 13/105 266/144 |
| 4,897,113 | A | * | 1/1990 | Becerra-Novoa | ....... C21B 13/02 75/436 |

* cited by examiner

*Primary Examiner* — Anthony J Zimmer
*Assistant Examiner* — Ricardo D Morales
(74) *Attorney, Agent, or Firm* — Eugenio J. Torres-Oyola; Victor M. Rodriguez-Reyes; Rafael Rodriguez-Muriel

(57) ABSTRACT

The invention relates to the use of off-gas from furnaces (2) for the process of reduction of iron oxide. The bypass duct leads off-gas with reduction atmosphere directly into the reactor, passing through and back to join the main duct of dedusting system using negative pressure of the primary dedusting system. The off-gas directly heats up the iron oxide pellet and maintain the reduction atmosphere in the reactor and allow the reaction to proceed and prevent re-oxidation.

7 Claims, 1 Drawing Sheet

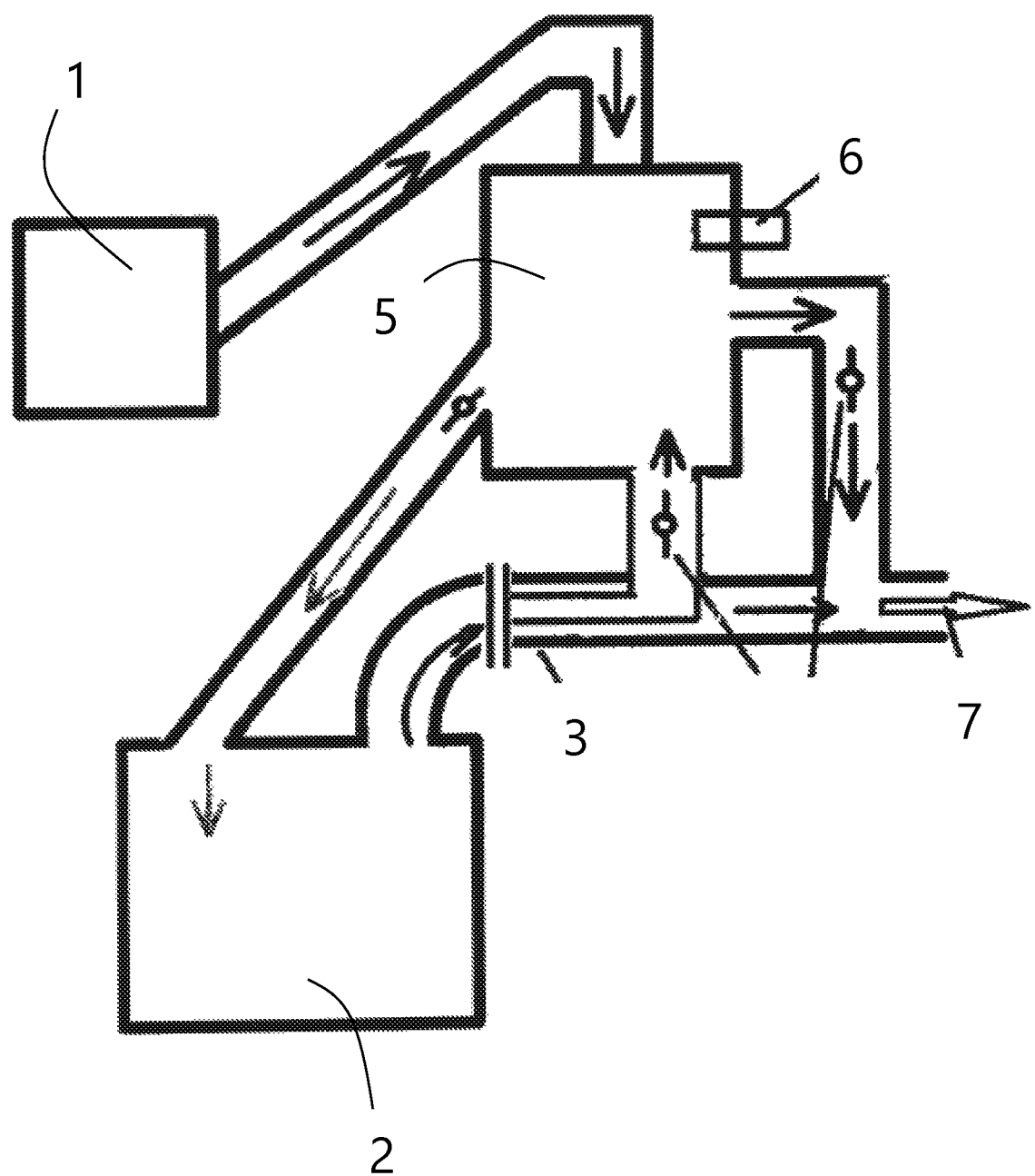

METHOD OF UTILIZING FURNACE OFF-GAS FOR REDUCTION OF IRON OXIDE PELLETS

CROSS-REFERENCE TO RELATED APPLICATIONS

This application is the entry into national phase of International Application No. PCT/TH2016/000062 filed on Jul. 15, 2016, the content of which is hereby incorporated by reference in its entirety, which claims the benefit of Thailand Application No. 1501004150 filed on Jul. 23, 2015, the content of which is hereby incorporated by reference in its entirety.

FIELD OF THE DISCLOSURE

This Invention is in the field of metallurgical engineering and mechanical engineering and related to iron and steel-making process.

BACKGROUND

The processes of steelmaking mainly used in the steel industry are;

1. Basic Oxygen Furnace (BOF): It is made for taking hot metal from blast furnace that is liquid iron containing around 4% of carbon. BOF convert hot metal into liquid steel by blowing oxygen to react with carbon in the hot metal to create heat that keep reaction continues.

2. Electric Arc Furnace (EAF): It is made for melting of solid iron and steel by the heat from the arc of the electrodes as the main source of energy. Oxygen and carbon are injected during the stages of steelmaking process for refining and for adding energy.

Both processes and others generate great amount of heat and dust so dedusting system is necessary. In most of the cases, dedusting system comprises of primary suction for taking off-gas directly from the furnace and secondary suction for taking dust and fume circulating in the building and for preventing dust escaping from the building to the open atmosphere.

U.S. Pat. No. 3,443,931 teaches a method of metallizing compacts of iron oxide containing a carbonaceous material. The compacts are formed, dried, and preindurated up to a temperature between 1600 and 1800° F. (° C.) The pellets are them rapidly heated by exposure to a radiant heat source which produces an environment at a temperature between 2300-2600° F. (° C.) for a sufficient time so that a liquidus phase is formed within the compacts. After the liquidus phase is formed, the compacts tend to shrink and then are immediately chilled by exposure to a cold environment.

Kaneko et al. U.S. Pat. No. 4,701,214 teaches a method of producing iron from finely divided iron oxide comprising the steps of: mixing iron oxide or iron fines with finely divided coal and a binder to form a mixture, agglomerating the mixture by compacting, pelletizing, or briquetting the mixture to form agglomerates or pellets, introducing the pellets to a rotary hearth furnace to pre-reduce the iron in the pellets, introducing the pre-reduced pellets into a smelting reduction vessel as the metallic charge constituent, introducing particulate carbonaceous fuel and oxygen to the smelting reduction vessel through the bottom of the vessel to react with the melt or bath within the vessel, reduce the iron to elemental iron and form an off gas containing CO and H2, introducing the off-gas into the rotary hearth furnace as process gas to pre-reduce the pellets therein, and drawing off the hot metal from the smelting reduction vessel.

The pre-reduced compacts are preferably discharged from the rotary hearth furnace at a temperature of at least 1000° C. into the smelting reduction vessel to form the molten iron product.

W01997026375A1 revealed an apparatus for preheating self-reducing pellets for direct use in iron making or steelmaking in which a preheat chamber contains the pellet and is externally heated using waste exhaust gas and secondarily heated directly by using an internal preheat burner. The preheat chamber gases are vented into external heating chamber where any CO present is post-combusted to produce CO2 with energy from the post-combustion used to contribute to external heating of preheat chamber.

SUMMARY OF THE DISCLOSURE

Various type of steelmaking furnaces i.e. Electric Arc Furnace, Basic Oxygen Furnace or others are using oxygen injection or blowing to create reaction with carbon contained in the raw material or injected. The reaction helps generating heat for melting and reducing carbon content to convert iron into steel. The result of this reaction is the off-gas from the furnace with high temperature and high content of CO and H2.

The Invention is created to utilize the heat and reduction atmosphere of the off-gas from various types of steelmaking furnace to heat the pellets and to induce reduction of iron oxide in the pellets by carbon contained in the pellets. The product from the reaction is hot Direct Reduced Iron (DRI) which will be charged directly into the furnace as raw material for steelmaking process. This is to prevent re-oxidation and to save energy by putting heat contained in DRI into the furnace.

Pellet is made of iron oxide incorporated with carbonaceous material. The iron oxide could be iron ore, millscale, dust or other form of iron oxide generated as product or waste from other processes.

BRIEF DESCRIPTION OF THE DRAWINGS

FIG. 1 Shows the process of Method of Utilizing Furnace Off-gas for reduction of Iron Oxide Pellets

DETAILED DISCLOSURE

FIG. 1 Shows the process of Method of Utilizing Furnace Off-gas for reduction of Iron Oxide Pellets The invention utilizes the off-gas from furnaces (2), which could be Electric Arc Furnace or Basic Oxygen Furnace or other types of furnace with reducing off-gas, for reduction of pellets incorporated with iron oxide and carbonaceous material.

The reactor (5) is located above the furnace not directly on top but offset to aside so it does not obstruct operation when charging input material into the furnace.

A portion of the off-gas is led into the inside of reactor (5) entry the bypass duct (3) and out of the reactor (5) to rejoin the primary duct. The bypass duct (3) allows utilization of existing primary suction (7) that is usually required in all furnaces (2) to induce a portion of primary off-gas flow into Reactor (5) without dedicated fan or equipment to produce suction (7) or negative pressure specifically for Reactor.

Off-gas from furnace, as it goes into Reactor (5), heats up the reactor (5) and keeps it under reducing atmosphere. At the high temperature, the reaction goes and iron oxide pellets are reduced to direct reduced iron (DRI). The re-oxidation of iron in DRI is prevented by the reducing atmosphere in the reactor (5). There is a burner (6) inside the reactor (5) to operate as supplementary to the off-gas to maintain temperature and reducing atmosphere inside the reactor (5). Discharging pallets from storage (1) into reactor (5) is made via a discharging mechanism as well as discharging of direct reduced iron into the furnace. The timing of the is to be made in the right sequence with the process of the furnace (2) in order to allowing sufficient time for melting DRI into liquid and for decarburizing to reach desired carbon content of liquid steel.

It is important that the penetrating of external air into the reactor (5) is minimized. Most of the furnaces (2) need to have movements to accommodate several steps of the steelmaking process (i.e. input material charging, de-slagging or tapping) whereas the primary dedusting system is in fixed position. This makes a split or a gap between the primary duct and the off-gas outlet of the shell is inevitable. The inlet of the bypass duct (3) is made as inner duct of primary duct, therefore, the external air coming via the gap between furnace and primary duct tends to flow along the suction (7) of primary dedusting line. The inner duct, is protected by negative pressure of the outer duct, receive mainly off-gas from the furnace. There are also dampers (4) at the inlet and outlet duct of the reactor (5) to control flow rate and to isolate the reactor (5) when required.

What is claimed is:

1. A method of using an apparatus for the reduction of pellets comprised of iron oxide and carbonaceous material, comprised of a pellet storage (1), a bypassed duct (3) a steelmaking furnace (2) having an off-gas outlet, a reactor (5), a burner (6) inside the reactor (5) and a main duct of a primary dedusting system, wherein the bypassed duct (3) and the main duct are connected to the off-gas outlet of the steelmaking furnace (2) independently of each other, and wherein the reactor (5) comprises at least one inlet duct connected to the bypassed duct (3) and at least one outlet duct connected the main duct, the method comprising the steps of:

discharging pellets and direct reduced iron from the pellet storage into the reactor (5) via a discharging mechanism;

using the by-pass duct (3) to lead a portion of steelmaking furnace (2) off-gas directly into a reactor (5) via the inlet duct;

wherein the off-gas flows from the reactor (5), via the outlet duct, to the main duct of the primary dedusting system;

wherein the off-gas heats up the reactor and keeps it under a reducing atmosphere;

wherein the primary dedusting system induces off-gas flow from the steelmaking furnace (2) to the reactor (5) by negative pressure (7);

wherein iron pellets are directly heated by the off-gas under the reducing atmosphere in the reactor (5) preventing re-oxidation; and wherein the burner operates to supplementary maintain the temperature and reducing atmosphere in the reactor, in addition to the off-gas.

2. The method of claim 1, wherein the at least one inlet duct has at least one damper to control the flow of off-gas into the reactor from the bypassed duct (3) and the at least one outlet duct has a least one damper to control the flow of off-gas out of the reactor (5) and into the main duct.

3. The method of claim 1, where the reactor (5) is installed above the furnace (2) offset to the side so that it can discharge a direct reduced iron into the furnace by gravity without blocking furnace operation.

4. The method of claim 1, wherein the furnace is a basic oxygen furnace.

5. The method of claim 1, wherein the furnace is an electric arc furnace.

6. The method of claim 1, wherein the bypassed duct is located within the main duct.

7. The method of claim 6, wherein the bypassed duct leads off-gas into the reactor from the furnace, and wherein negative pressure in the main duct minimizes penetration of external air into the reactor.

* * * * *